US012775816B2

(12) United States Patent
Bush et al.

(10) Patent No.: US 12,775,816 B2
(45) Date of Patent: Oct. 27, 2026

(54) METHODS AND SYSTEMS FOR SELECTIVELY PREVENTING OPERATION OF A COMPONENT

(71) Applicant: Lexmark International, Inc., Lexington, KY (US)

(72) Inventors: Stephen Porter Bush, Richmond, KY (US); Timothy John Rademacher, Richmond, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 17/498,494

(22) Filed: Oct. 11, 2021

(65) Prior Publication Data

US 2022/0300778 A1 Sep. 22, 2022

Related U.S. Application Data

(60) Provisional application No. 63/162,861, filed on Mar. 18, 2021.

(51) Int. Cl.
*G06F 15/00* (2006.01)
*G06K 15/00* (2006.01)

(52) U.S. Cl.
CPC ....... *G06K 15/4095* (2013.01); *G06K 15/407* (2013.01)

(58) Field of Classification Search
CPC ......................... G06K 15/4095; G06K 15/407
USPC ........................................................ 358/1.14
See application file for complete search history.

(56) References Cited

U.S. PATENT DOCUMENTS

| | | | | |
|---|---|---|---|---|
| 6,786,659 | B1 * | 9/2004 | Katayama ............ | H04N 1/6033 358/1.9 |
| 2004/0193549 | A1 * | 9/2004 | Alexia ................. | G06Q 20/382 705/64 |
| 2016/0214391 | A1 * | 7/2016 | Ward ................... | B41J 2/17546 |

* cited by examiner

*Primary Examiner* — Mark R Milia

(57) ABSTRACT

An imaging system comprising: a system control component having host firmware stored thereon, the system control component comprising a print head operation module actuatable by the host firmware to transmit signals to a print head of the imaging system, the signals configured to cause the print head to operate; and a monitor-enforce module, the monitor-enforce module comprising: a monitor interface configured to receive security information from a security device of the imaging system, and an enforce module, the enforce module being configured to selectively interrupt said signals transmitted by the print head operation module, based on the security information.

16 Claims, 3 Drawing Sheets

METHODS AND SYSTEMS FOR SELECTIVELY PREVENTING OPERATION OF A COMPONENT

CROSS REFERENCE TO RELATED APPLICATIONS

This application claims priority and benefit under 35 U.S.C. 119(e) from U.S. provisional application No. 63/162,861 titled "Hardware-based Security Monitoring and Enforcement," having a filing date of Mar. 18, 2021.

BACKGROUND

1. Technical Field

The present disclosure generally relates to methods and systems for preventing the operation of a component, and, more particularly, methods and systems for preventing the operation of a component within an imaging device.

2. Description of the Related Art

In electronic systems, it is often desirable to confirm the authenticity of a component of the electronic system to ensure that the entire system operates as designed. Once a component is determined to be non-authentic, the electronic system ceases a corresponding operation so as to ensure the non-authentic component is not utilized.

Non-authentic components employ various techniques to mimic the behavior of authentic components and/or to modify or manipulate the electronic system to cause the system to operate using the non-authentic component. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

Accordingly, there is a need for improved systems and methods for preventing an operation of an electronic system, for example when it is determined that a component is non-authentic.

SUMMARY

The present disclosure provides example methods and systems that may be implemented in any general electronic system or specifically in an imaging/printing device/system to thwart the use of non-authentic components.

There is provided an imaging system comprising:

- a system control component having host firmware stored thereon, the system control component comprising a print head operation module actuatable by the host firmware to transmit signals to a print head of the imaging system, the signals configured to cause the print head to operate; and
- a monitor-enforce module, the monitor-enforce module comprising:
  - a monitor interface configured to receive security information from a security device of the imaging system, and
  - an enforce module, the enforce module being configured to selectively interrupt said signals transmitted by the print head operation module, based on the security information.

By interrupting the signals transmitted by the print head operation module using the monitor-enforce module, the print head may be prevented from operating. The system is less vulnerable to modification or manipulation of the host firmware, for example by inauthentic supply items. Even if the host firmware is modified or manipulated, the enforce module will still prevent the operation of the print head by interrupting the signals.

In this application, the term selectively interrupting refers to interrupting only when one or more conditions are fulfilled. For example, when no authentication of a supply item has occurred since start-up of the imaging system.

In certain implementations, the system control component may comprise an SoC, a processor, a memory and/or an integrated circuit (IC), such as an application-specific IC (ASIC). In certain implementations, the imaging system comprises an imaging device security device and/or a supply item. The supply item may comprise a supply item security device.

In certain implementations, the monitor-enforce module is on the system control component and the monitor-enforce module comprises a hardware block on the system control component, configured to receive security information and selectively interrupt the print head operation.

In certain implementations, the hardware block is a dedicated hardware block. The dedicated hardware block may be configured to perform only operations of the monitor-enforce module.

In certain implementations, the hardware block is configured to perform operations to receive security information and/or to selectively interrupt the print head operation.

In certain implementations, the enforce module is configured to interrupt the signals transmitted by the print head operation module via a gate. In certain implementations, the gate may be on the system control component, outside of the print head operation module, or in the print head operation module.

In certain implementations, the monitor-enforce module is separate to the system control component. In certain implementations, the monitor-enforce module may be an integrated circuit, for example a microcontroller or ASIC. In certain implementations, the monitor-enforce module is a programmable device. In certain implementations, the programmable device is locked or lockable.

In certain implementations, the security information comprises: authentication status for one or more supply items of the imaging system, and/or a disable command, and/or authentication information from one or more supply items of the imaging system.

In certain implementations, the authentication information is a response to a challenge. In certain implementations, the challenge is an input for a cryptographic operation to be performed on the supply item. In certain implementations, the challenge may comprise a random value which may be produced from a pseudo random number generator (PRNG), for example, using a cryptographic operation. In certain implementations, the response is a result of the cryptographic operation. The response may be a checksum and/or signature.

In certain implementations, the monitor-enforce module is configured to generate the challenge. The system control component may be configured to read the challenge from the monitor-enforce module and send the challenge to the security device of the supply item.

In certain implementations, the monitor interface is configured to receive the security information from a security communication system of the imaging system. In certain implementations, the monitor interface is configured to periodically check the security communication system for the security information. In certain implementations, the security communication system may comprise a hardware signalling communication system. In certain implementations, the monitor interface may be a follower component. In certain implementations, the security communication system is a security communication bus, for example, an I2C bus. In certain implementations, the monitor interface is configured to receive signals from the security communication system via an SCL line. In certain implementations, the signals may be PWM encoded, or UART, NRZ, Manchester, 8b/10b or any other suitable encoded signal.

In certain implementations, the security communication system is configured to allow the monitor interface of the monitor-enforce module to receive communication from: a security device of a supply item of the imaging system, and/or an imaging device security device and/or the host firmware.

In certain implementations, the monitor interface is configured to communicate with the host firmware. The host firmware may be configured to send, to the monitor interface, information which enables the monitor-enforce module to determine the authenticity of a supply item based on the security information. Communication between the monitor interface and the host firmware may be separate from the security communication system.

In certain implementations, the monitor interface is configured to monitor the security communication system. In certain implementations, the monitor-enforce module is incapable of transmitting a signal on the security communication system. In certain implementations, the monitor-enforce module has an address on the security communication system. In certain implementations, the system control component sends a challenge on the security communication system to a security device of a supply item and the security device of the supply item returns a response to the challenge on the security communication system. The response is received by the monitor-enforce module. In certain implementations, the security device of the supply item returns a response to the challenge on the security communication system to the system control component and the monitor interface of the monitor-enforce module receives the response by monitoring the security communication system.

In certain implementations, the enforce module is configured to interrupt signals transmitted by the print head operation module when the response is not authenticated. In certain implementations, the enforce module is configured to interrupt signals transmitted by the print head operation module when no security information, and/or no authenticated response has been received by the monitor interface for a pre-determined time period, and/or since start-up of the imaging system.

In certain implementations, the enforce module is configured to not interrupt the signals when the security information confirms authenticity of a supply item and the enforce module is configured to interrupt the signals when the security information does not confirm the authenticity of the supply item.

In certain implementations, the enforce module is configured to interrupt the signals when an error occurs. In certain implementations, the enforce module is configured to interrupt the signals when the security information contains a disable command.

In certain implementations, the enforce module is configured to interrupt the signals unless security information confirming authenticity of all supply items in the imaging system has been received during a preceding time period. The time period may be pre-set.

In certain implementations, the signals are transmitted by the print head operation module on a plurality of channels, each channel corresponding to a respective function of the print head, and the enforce module is configured to selectively interrupt each of the channels based on the security information. In certain implementations, the security information includes channel security information corresponding to at least one of the channels.

In certain implementations, each channel is interruptible by a respective gate and the enforce module is configured to selectively interrupt each of the channels by selectively operating the respective gates.

In certain implementations, the security information is a security status packet (SSP). In certain implementations, the SSP is from the supply item security device. In certain implementations, the SSP is from the imaging device security device.

In certain implementations, the print head operation module is a video output.

In certain implementations, the host firmware is configured to perform functions including supplies authentication, supplies metering, and/or enforcement of an authentication process.

There is further provided a method of enforcing security on an imaging system as described above, the method comprising: selectively interrupting, by the enforce module, signals transmitted by the print head operation module, based on the security information.

In certain implementations, interrupting, by the enforce module, comprises operating a gate.

In certain implementations, the method further comprises, receiving, by the monitor interface, the security information from a security communication system of the imaging system. In certain implementations, the method further comprises, periodically checking, by the monitor interface a security communication system of the imaging system for the security information.

In certain implementations, the monitor interface receives signals from the security communication system via an SCL line. In certain implementations, the signals may be PWM encoded, or UART, NRZ, Manchester, 8b/10b or any other suitable encoded signal.

In certain implementations, the security information comprises: authentication status for one or more supply items of the imaging system, and/or a disable command, and/or authentication information from one or more supply items of the imaging system.

In certain implementations, the authentication information is a response to a challenge. In certain implementations, the challenge is an input for a cryptographic operation to be performed on the supply item. In certain implementations, the challenge may comprise a random value which may be produced from a pseudo random number generator (PRNG), for example, using a cryptographic operation. In certain implementations, the response is a result of the cryptographic operation. The response may be a checksum and/or signature.

In certain implementations, the method further comprises: sending, by the system control component on the security communication system to a security device of a supply item of the imaging system, a challenge, receiving, by the monitor interface on the security communication system from the security device of the supply item, the authentication information, the authentication information being a response to the challenge.

In certain implementations, the monitor-enforce module performs an authentication process on the response to determine if the supply item is authentic. The authentication process may comprise a cryptographic method, for example, HMAC or CMAC or may comprise signature and/or verification with RSA/ECDSA, or another cryptographic operation. The security information may include a HMAC or CMAC checksum on a security status payload of the security information. The authentication process may comprise the monitor-enforce module calculating a checksum on the security status payload and comparing the result to the HMAC or CMAC checksum. If a signature scheme is used, the security information may include a signature of the security status payload, for example, signed with a private key contained in the supply item security device. The monitor-enforce module may be configured to verify the signature with a corresponding public key during the authentication process.

In certain implementations, the challenge is a cryptographic operation. In certain implementations, the response is a result of the cryptographic operation. The response may be a checksum and/or signature.

In certain implementations, the monitor interface receives communication, via the security communication system from: a security device of a supply item of the imaging system, and/or an imaging device security device and/or the host firmware.

In certain implementations, the monitor interface communicates with the host firmware. The host firmware may send, to the monitor interface, information which enables the monitor-enforce module to determine the authenticity of a supply item based on the security information. Communication between the monitor interface and the host firmware may be separate from the security communication system.

In certain implementations, the monitor interface monitors the security communication system. In certain implementations, the monitor-enforce module is incapable of transmitting a signal on the security communication system. In certain implementations, the monitor-enforce module has an address on the security communication system.

In certain implementations, the enforce module interrupts signals transmitted by the print head operation module when the response is not authenticated. In certain implementations, the enforce module interrupts signals transmitted by the print head operation module when no security information, and/or no authenticated response has been received by the monitor interface for a pre-determined time period, and/or since start-up of the imaging system.

In certain implementations, the enforce module does not interrupt the signals when the security information confirms authenticity of a supply item and the enforce module does interrupt the signals when the security information does not confirm the authenticity of the supply item.

In certain implementations, the enforce module interrupts the signals when an error occurs. In certain implementations, the enforce module interrupts the signals when the security information contains a disable command.

In certain implementations, the enforce module interrupts the signals unless security information confirming authenticity of all supply items in the imaging system has been received during a preceding time period. In certain implementations, the time period is pre-set.

In certain implementations, the signals are transmitted by the print head operation module on a plurality of channels, each channel corresponding to a respective function of the print head, and the enforce module selectively interrupts each of the channels based on the security information. In certain implementations, the security information includes channel security information corresponding to at least one of the channels.

In certain implementations, the host firmware performs functions including supplies authentication, supplies metering, and/or enforcement of an authentication process.

There is further provided an electronic system comprising:

a system control component having host firmware stored thereon, the system control component comprising a component operation module actuatable by the host firmware to transmit signals to a component of the electronic system, the signals configured to cause the component to operate; and a monitor-enforce module, the monitor-enforce module comprising:

a monitor interface configured to receive security information from a security device of the electronic system, and an enforce module, the enforce module being configured to selectively interrupt said signals transmitted by the component operation module, based on the security information.

In certain implementations, the system control component may comprise an SoC, a processor, a memory and/or an integrated circuit (IC), such as an application-specific IC (ASIC). In certain implementations, the electronic system comprises an electronic device security device and/or a supply item. The supply item may comprise a supply item security device.

In certain implementations, the monitor-enforce module is on the system control component and the monitor-enforce module comprises a hardware block on the system control component, configured to receive security information and selectively interrupt the component operation.

In certain implementations, the hardware block is a dedicated hardware block. The dedicated hardware block may be configured to perform only operations of the monitor-enforce module. In certain implementations, the hardware block is configured to perform operations to receive security information and/or to selectively interrupt the component operation.

In certain implementations, the enforce module is configured to interrupt the signals transmitted by the component operation module via a gate. In certain implementations, the gate may be on the system control component, outside of the component operation module, or in the component operation module.

In certain implementations, the monitor-enforce module is separate to the system control component. In certain implementations, the monitor-enforce module may be an integrated circuit, for example a microcontroller or ASIC. In certain implementations, the monitor-enforce module is a programmable device. In certain implementations, the programmable device is locked or lockable.

In certain implementations, the security information comprises: authentication status for one or more supply items of the electronic system, and/or a disable command, and/or authentication information from one or more supply items of the electronic system.

In certain implementations, the authentication information is a response to a challenge. In certain implementations, the challenge is an input for a cryptographic operation to be performed on the supply item. In certain implementations, the challenge may comprise a random value which may be produced from a pseudo random number generator (PRNG), for example, using a cryptographic operation. In certain implementations, the response is a result of the cryptographic operation. The response may be a checksum and/or signature.

In certain implementations, the monitor interface is configured to receive the security information from a security communication system of the electronic system. In certain implementations, the monitor interface is configured to periodically check the security communication system for the security information.

In certain implementations, the security communication system may comprise a hardware signalling communication system. In certain implementations, the monitor interface may be a follower component. In certain implementations, the security communication system is a security communication bus, for example, an I2C bus.

In certain implementations, the monitor interface is configured to receive signals from the security communication system via an SCL line. In certain implementations, the signals may be PWM encoded, or UART, NRZ, Manchester, 8b/10b or any other suitable encoded signal.

In certain implementations, the security communication system is configured to allow the monitor interface of the monitor-enforce module to receive communication from: a security device of a supply item of the electronic system, and/or an electronic device security device and/or the host firmware.

In certain implementations, the monitor interface is configured to communicate with the host firmware. The host firmware may be configured to send, to the monitor interface, information which enables the monitor-enforce module to determine the authenticity of a supply item based on the security information. Communication between the monitor interface and the host firmware may be separate from the security communication system.

In certain implementations, the monitor interface is configured to monitor the security communication system. In certain implementations, the monitor-enforce module is incapable of transmitting a signal on the security communication system. In certain implementations, the monitor-enforce module has an address on the security communication system. In certain implementations, the system control component sends a challenge on the security communication system to a security device of a supply item and the security device of the supply item returns a response to the challenge on the security communication system. The response is received by the monitor-enforce module. In certain implementations, the security device of the supply item returns a response to the challenge on the security communication system to the system control component and the monitor interface of the monitor-enforce module receives the response by monitoring the security communication system.

The enforce module may be configured to interrupt signals transmitted by the component operation module when the response is not authenticated. In certain implementations, the enforce module is configured to interrupt signals transmitted by the component operation module when no security information, and/or no authenticated response has been received by the monitor interface for a pre-determined time period, and/or since start-up of the electronic system.

In certain implementations, the enforce module is configured to not interrupt the signals when the security information confirms authenticity of a supply item and the enforce module is configured to interrupt the signals when the security information does not confirm the authenticity of the supply item.

In certain implementations, the enforce module is configured to interrupt the signals when an error occurs. In certain implementations, the enforce module is configured to interrupt the signals when the security information contains a disable command.

In certain implementations, the enforce module is configured to interrupt the signals unless security information confirming authenticity of all supply items in the electronic system has been received during a preceding time period. The time period may be pre-set.

In certain implementations, the signals are transmitted by the component operation module on a plurality of channels, each channel corresponding to a respective function of the component, and the enforce module is configured to selectively interrupt each of the channels based on the security information. In certain implementations, the security information includes channel security information corresponding to at least one of the channels.

In certain implementations, each channel is interruptible by a respective gate and the enforce module is configured to selectively interrupt each of the channels by selectively operating the respective gates.

In certain implementations, the security information is a security status packet (SSP). In certain implementations, the SSP is from the supply item security device. In certain implementations, the SSP is from the electronic device security device.

In certain implementations, the component operation module is a video output.

In certain implementations, the host firmware is configured to perform functions including supplies authentication, supplies metering, and/or enforcement of an authentication process.

There is further provided, a method of enforcing security on an electronic system as described above, the method comprising:

- selectively interrupting, by the enforce module, signals transmitted by the component operation module, based on the security information.

In certain implementations, interrupting, by the enforce module, comprises operating a gate.

In certain implementations, the method further comprises, receiving, by the monitor interface, the security information from a security communication system of the electronic system. In certain implementations, the method further comprises, periodically checking, by the monitor interface a security communication system of the electronic system for the security information.

In certain implementations, the monitor interface receives signals from the security communication system via an SCL line. In certain implementations, the signals may be PWM encoded, or UART, NRZ, Manchester, 8b/10b or any other suitable encoded signal.

In certain implementations, the method further comprises: sending, by the system control component on the security communication system to a security device of a supply item of the electronic system, a challenge, receiving, by the monitor interface on the security communication system from the security device of the supply item, the authentication information, the authentication information being a response to the challenge.

In certain implementations, the monitor-enforce module performs an authentication process on the response to determine if the supply item is authentic. The authentication process may comprise a cryptographic method, for example, HMAC or CMAC or may comprise signature and/or verification with RSA/ECDSA, or another cryptographic operation. The security information may include a HMAC or CMAC checksum on a security status payload of the security information. The authentication process may comprise the monitor-enforce block calculating a checksum on the security status payload and comparing the result to the HMAC or CMAC checksum. If a signature scheme is used, the security information may include a signature of the security status payload, for example, signed with a private key contained in the component security device. The monitor-enforce module may be configured to verify the signature with a corresponding public key during the authentication process.

In certain implementations, the challenge is a cryptographic operation. In certain implementations, the response is a result of the cryptographic operation. The response may be a checksum and/or signature.

In certain implementations, the monitor interface receives communication, via the security communication system from: a security device of a supply item of the electronic system, and/or an electronic device security device and/or the host firmware.

In certain implementations, the monitor interface communicates with the host firmware. The host firmware may send, to the monitor interface, information which enables the monitor-enforce module to determine the authenticity of a supply item based on the security information. Communication between the monitor interface and the host firmware may be separate from the security communication system.

In certain implementations, the monitor interface monitors the security communication system. In certain implementations, the monitor-enforce module is incapable of transmitting a signal on the security communication system. In certain implementations, the monitor-enforce module has an address on the security communication system.

In certain implementations, the enforce module interrupts signals transmitted by the component operation module when the response is not authenticated. In certain implementations, the enforce module interrupts signals transmitted by the component operation module when no security information, and/or no authenticated response has been received by the monitor interface for a pre-determined time period, and/or since start-up of the electronic system.

In certain implementations, the enforce module does not interrupt the signals when the security information confirms authenticity of a supply item and the enforce module does interrupt the signals when the security information does not confirm the authenticity of the supply item.

In certain implementations, the enforce module interrupts the signals when an error occurs. In certain implementations, the enforce module interrupts the signals when the security information contains a disable command.

In certain implementations, the enforce module interrupts the signals unless security information confirming authenticity of all supply items in the electronic system has been received during a preceding time period. In certain implementations, the time period is pre-set.

In certain implementations, the signals are transmitted by the component operation module on a plurality of channels, each channel corresponding to a respective function of the component, and the enforce module selectively interrupts each of the channels based on the security information. In certain implementations, the security information includes channel security information corresponding to at least one of the channels.

In certain implementations, the host firmware performs functions including supplies authentication, supplies metering, and/or enforcement of an authentication process.

There is further provided, an imaging system comprising:

a system control component comprising:

a print head operation module configured to transmit signals to a print head of the imaging system, the signals configured to cause the print head to operate; and a monitor-enforce module, the monitor-enforce module comprising a dedicated hardware block on the system control component, the hardware block comprising:

a monitor interface configured to receive security information from a security device of the imaging system, and an enforce module, the enforce module being configured to selectively interrupt said signals transmitted by the print head operation module, based on the security information.

In certain implementations, the system control component has host firmware stored thereon. In certain implementations, the system control component further comprises the print head operation module. In certain implementations, the print head operation module may be a logic block.

In certain implementations, the system control component may comprise an SoC, a processor, a memory and/or an integrated circuit (IC), such as an application-specific IC (ASIC). In certain implementations, the imaging system comprises an imaging device security device and/or a supply item. The supply item may comprise a supply item security device.

The dedicated hardware block is configured to perform only operations of the monitor-enforce module.

In certain implementations, the hardware block is configured to perform operations to receive security information and/or to selectively interrupt the print head operation.

In certain implementations, the enforce module is configured to interrupt the signals transmitted by the print head operation module via a gate.

In certain implementations, the gate may be on the system control component, outside of the print head operation module, or in the print head operation module.

In certain implementations, the security information comprises: authentication status for one or more supply items of the imaging system, and/or a disable command, and/or authentication information from one or more supply items of the imaging system.

In certain implementations, the authentication information is a response to a challenge. In certain implementations, the challenge is an input for a cryptographic operation to be performed on the supply item. In certain implementations, the challenge may comprise a random value which may be produced from a pseudo random number generator (PRNG), for example, using a cryptographic operation. In certain implementations, the response is a result of the cryptographic operation. In certain implementations, the response is a checksum and/or signature.

In certain implementations, the monitor interface is configured to receive the security information from a security communication system of the imaging system. In certain implementations, the monitor interface is configured to periodically check the security communication system for the security information.

In certain implementations, the security communication system may comprise a hardware signalling communication system. In certain implementations, the monitor interface may be a follower component. In certain implementations, the security communication system is a security communication bus, for example, an I2C bus.

In certain implementations, the monitor interface is configured to receive signals from the security communication system via an SCL line. In certain implementations, the signals may be PWM encoded, or UART, NRZ, Manchester, 8b/10b or any other suitable encoded signal.

In certain implementations, the security communication system is configured to allow the monitor interface of the monitor-enforce module to receive communication from: a security device of a supply item of the imaging system, and/or an imaging device security device and/or the host firmware.

In certain implementations, the monitor interface is configured to communicate with the host firmware. The host firmware may be configured to send, to the monitor interface, information which enables the monitor-enforce module to determine the authenticity of a supply item based on the security information. Communication between the monitor interface and the host firmware may be separate from the security communication system.

In certain implementations, the monitor interface is configured to monitor the security communication system. In certain implementations, the monitor-enforce module is incapable of transmitting a signal on the security communication system. In certain implementations, the monitor-enforce module has an address on the security communication system. In certain implementations, the system control component sends a challenge on the security communication system to a security device of a supply item and the security device of the supply item returns a response to the challenge on the security communication system. The response is received by the monitor-enforce module. In certain implementations, the security device of the supply item returns a response to the challenge on the security communication system to the system control component and the monitor interface of the monitor-enforce module receives the response by monitoring the security communication system.

In certain implementations, the enforce module is configured to interrupt signals transmitted by the print head operation module when the response is not authenticated. In certain implementations, the enforce module is configured to interrupt signals transmitted by the print head operation module when no security information, and/or no authenticated response has been received by the monitor interface for a pre-determined time period, and/or since start-up of the imaging system.

In certain implementations, the enforce module is configured to not interrupt the signals when the security information confirms authenticity of a supply item and the enforce module is configured to interrupt the signals when the security information does not confirm the authenticity of the supply item.

In certain implementations, the enforce module is configured to interrupt the signals when an error occurs. In certain implementations, the enforce module is configured to interrupt the signals when the security information contains a disable command.

In certain implementations, the enforce module is configured to interrupt the signals unless security information confirming authenticity of all supply items in the imaging system has been received during a preceding time period. The time period may be pre-set.

In certain implementations, the signals are transmitted by the print head operation module on a plurality of channels, each channel corresponding to a respective function of the print head, and the enforce module is configured to selectively interrupt each of the channels based on the security information. In certain implementations, the security information includes channel security information corresponding to at least one of the channels.

In certain implementations, each channel is interruptible by a respective gate and the enforce module is configured to selectively interrupt each of the channels by selectively operating the respective gates.

In certain implementations, the security information is a security status packet (SSP). In certain implementations, the SSP is from the supply item security device. In certain implementations, the SSP is from the imaging device security device.

In certain implementations, the print head operation module is a video output.

In certain implementations, the host firmware is configured to perform functions including supplies authentication, supplies metering, and/or enforcement of an authentication process.

There is further provided, a method of enforcing security on an imaging system as described above, the method comprising:

selectively interrupting, by the enforce module, signals transmitted by the print head operation module, based on the security information.

In certain implementations, interrupting, by the enforce module, comprises operating a gate.

In certain implementations, the method further comprises, receiving, by the monitor interface, the security information from a security communication system of the imaging system.

In certain implementations, the method further comprises, periodically checking, by the monitor interface a security communication system of the imaging system for the security information.

In certain implementations, the monitor interface receives signals from the security communication system via an SCL line. In certain implementations, the signals may be PWM encoded, or UART, NRZ, Manchester, 8b/10b or any other suitable encoded signal.

In certain implementations, the method further comprises: sending, by the system control component on the security communication system to a security device of a supply item of the imaging system, a challenge, and receiving, by the monitor interface on the security communication system from the security device of the supply item, the authentication information, the authentication information being a response to the challenge.

In certain implementations, the enforce module performs an authentication process on the response to determine if the supply item is authentic. The authentication process may comprise a cryptographic method, for example, HMAC or CMAC or may comprise signature and/or verification with RSA/ECDSA, or another cryptographic operation. The security information may include a HMAC or CMAC checksum on a security status payload of the security information. The authentication process may comprise the monitor-enforce block calculating a checksum on the security status payload and comparing the result to the HMAC or CMAC checksum. If a signature scheme is used, the security information may include a signature of the security status payload, for example, signed with a private key contained in the supply item security device. The monitor-enforce module may be configured to verify the signature with a corresponding public key during the authentication process.

In certain implementations, the challenge is a cryptographic operation. In certain implementations, the response is a result of the cryptographic operation. The response may be a checksum and/or signature.

In certain implementations, the monitor interface receives communication, via the security communication system from: a security device of a supply item of the imaging system, and/or an imaging device security device and/or the host firmware.

In certain implementations, the monitor interface communicates with the host firmware. The host firmware may send, to the monitor interface, information which enables the monitor-enforce module to determine the authenticity of a supply item based on the security information. Communication between the monitor interface and the host firmware may be separate from the security communication system.

In certain implementations, the monitor interface monitors the security communication system. In certain implementations, the monitor-enforce module is incapable of transmitting a signal on the security communication system. In certain implementations, the monitor-enforce module has an address on the security communication system.

In certain implementations, the enforce module interrupts signals transmitted by the print head operation module when the response is not authenticated. In certain implementations, the enforce module interrupts signals transmitted by the print head operation module when no security information, and/or no authenticated response has been received by the monitor interface for a pre-determined time period, and/or since start-up of the imaging system.

In certain implementations, the enforce module does not interrupt the signals when the security information confirms authenticity of a supply item and the enforce module does interrupt the signals when the security information does not confirm the authenticity of the supply item.

In certain implementations, the enforce module interrupts the signals when an error occurs. In certain implementations, the enforce module interrupts the signals when the security information contains a disable command.

In certain implementations, the enforce module interrupts the signals unless security information confirming authenticity of all supply items in the imaging system has been received during a preceding time period. In certain implementations, the time period is pre-set.

In certain implementations, the signals are transmitted by the print head operation module on a plurality of channels, each channel corresponding to a respective function of the print head, and the enforce module selectively interrupts each of the channels based on the security information. In certain implementations, the security information includes channel security information corresponding to at least one of the channels.

In certain implementations, the host firmware performs functions including supplies authentication, supplies metering, and/or enforcement of an authentication process.

There is further provided, an electronic system comprising:

- a system control component comprising:
  - a component operation module configured to transmit signals to a component of the electronic system, the signals configured to cause the component to operate; and
  - a monitor-enforce module, the monitor-enforce module comprising a dedicated hardware block on the system control component, the hardware block comprising:
    - a monitor interface configured to receive security information from a security device of the electronic system, and
    - an enforce module, the enforce module being configured to selectively interrupt said signals transmitted by the component operation module, based on the security information.

In certain implementations, the system control component has host firmware stored thereon. In certain implementations, the system control component further comprises the component operation module. In certain implementations, the component operation module may be a logic block.

In any of the implementations/embodiments described herein, the components may be connected via any shared bus, such as I2C or peer-to-peer.

The methods and systems described above may be employed in any combination. The optional features described above are equally applicable to all of the described methods and systems and are not limited to the particular method/system with which they are described. The essential features of any of the methods described may be optional features of any other method described.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

Figure 1:
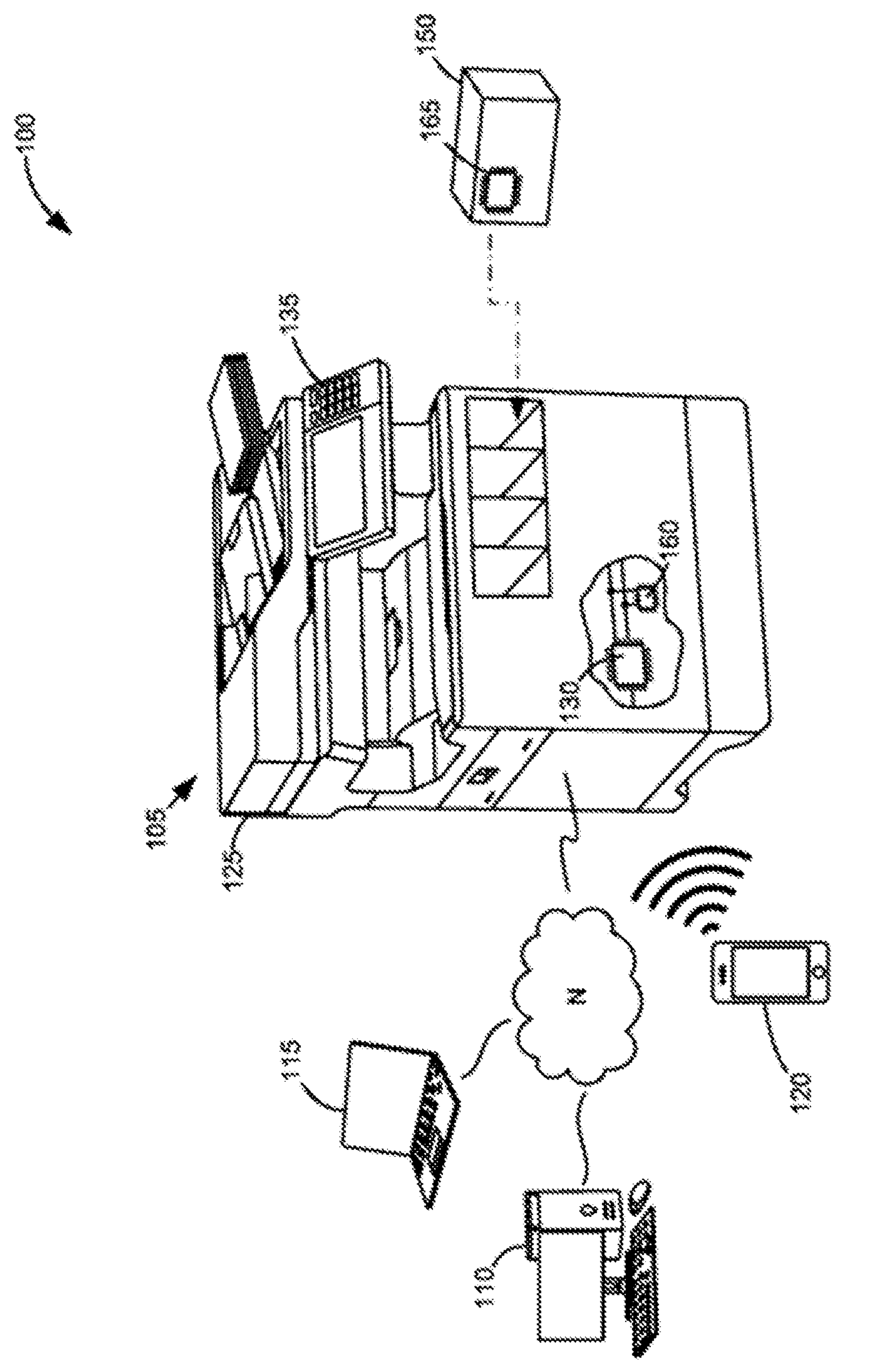
FIG. 1 is a diagrammatic view of an imaging system.

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for determining the authenticity of a component in an electronic system, such as an imaging/printer system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device component 130 and a user interface 135. The imaging device component 130 may be referred to as a system control component. Imaging device component 130 may include a processor and associated memory. In some examples, imaging device component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device component 130 may control the processing of print data. Imaging device component 130 includes a print head operation module which controls the operation of a print engine during printing of an image onto a sheet of media. The print engine may be referred to as a print head.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device security device 160 incorporated in imaging device 105 and a supply item security device 165 of supply item 150.

In one example, imaging device security device 160 in imaging device 105 may be similar to or the same as supply item security device 165 in consumable supply item 150. Optionally, the imaging device security device 160 may be programmed differently from supply item security device 165. Imaging device security device 160 and supply item security device 165 may operate in conjunction with one another to perform authentication functions.

Figure 2:
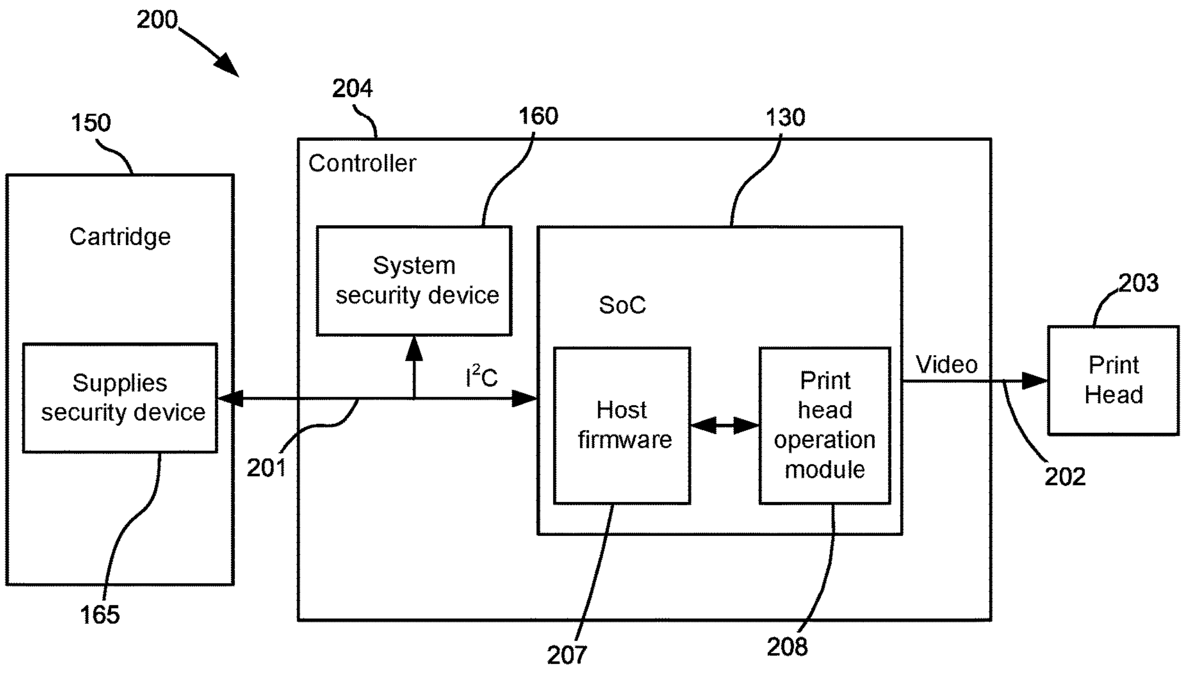
FIG. 2 is a diagrammatic view of components of an imaging system.

FIG. 2 shows some components of an imaging system 200 such as that shown in FIG. 1. The components include a supply item 150, for example a toner cartridge, a system control component 130 having host firmware 207 stored thereon, an imaging device security device 160, and a print head 203. The system control component 130 and imaging device security device 160 being provided in controller region 204 of the imaging system. The supply item 150 has a supply item security device 165. FIG. 2 shows a comparative example of an imaging system without a monitor-enforce module.

The host firmware 207 is configured to actuate print head operation module 208 to transmit video signals 202 to the print head 203 to cause the print head to operate. The supply item security device 165, system control component 130 and imaging device security device 160 are all communicatively connected by I2C bus 201 which forms a security communication system.

In use, the supply item 150 is authenticated via communication between supply item security device 165 with the imaging device security device 160 and the host firmware. The print head operation module 208 then causes the print head 203 to operate when the supply item 150 is authenticated. When the supply item authentication fails, the host firmware does not cause the print head 203 to operate. As no monitor-enforce module is present, the system of FIG. 2 relies on the host firmware 207 to disable printing if authentication fails.

Figure 3:
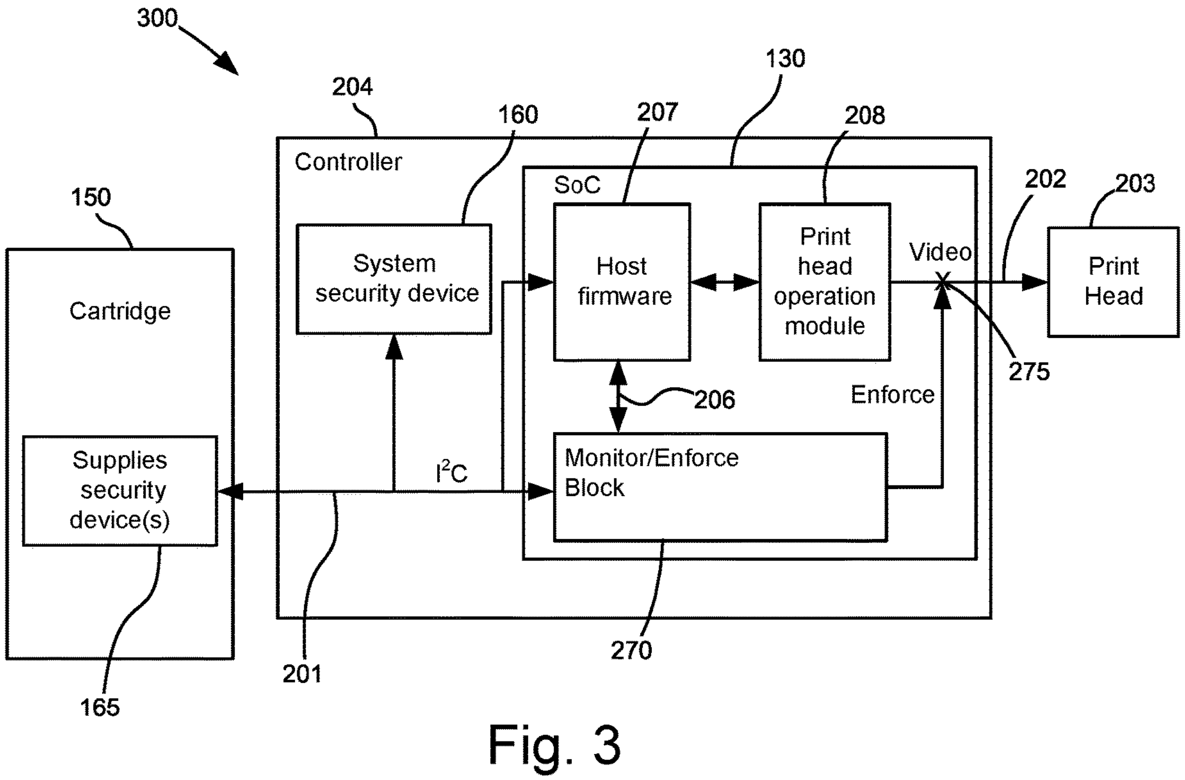
FIG. 3 is a diagrammatic view of components of an imaging system.

FIG. 3 shows some components of another imaging system such as that shown in FIG. 1. The imaging system 300 of FIG. 3 has a system control component 130 having host firmware 207 stored thereon. The system control component 130 comprises a print head operation module 208 actuatable by the host firmware 207 to transmit signals 202 to a print head 203 of the imaging system. The signals are configured to cause the print head 203 to operate. The imaging system 300 further has a monitor-enforce module 270, the monitor-enforce module comprising: a monitor interface configured to receive security information from a security device 160, 165 of the imaging system, and an enforce module, the enforce module being configured to selectively interrupt said signals 202 transmitted by the print head operation module 208, based on the security information.

By interrupting the signals transmitted by the print head operation module 208 using the monitor-enforce module 270, the print head 203 may be prevented from operating. The system is less vulnerable to modification or manipulation of the host firmware 207, for example by non-authentic supply items.

The components include a supply item 150, for example, a toner cartridge, and an imaging device security device 160. The supply item 150 has a supply item security device 165. The system control component 130 and imaging device security device 160 are provided in controller region 204 of the imaging system.

The print head operation module 208 comprises a video output which is configured to transmit video signals 202 to the print head 203 to cause the print head to operate. The supply item security device 165, system control component 130, imaging device security device 160 and monitor interface are all communicatively connected by I2C bus 201 which forms a security communication system.

In use, the supply item 150 is authenticated via communication between supply item security device 165 with the imaging device security device 160, the host firmware 207 and the monitor interface. The print head operation module 208 causes the print head 203 to operate. When the supply item authentication fails, the enforce module interrupts the signals 202 at gate 275. This means that even if the host firmware 207 is modified or manipulated, the enforce module will still prevent the operation of the print head 203 by interrupting the signals.

The system control component 130 is an SoC. The monitor-enforce module 270 is on the system control component 130 and the monitor-enforce module 270 comprises a hardware block on the system control component, configured to receive security information and selectively interrupt the print head operation signals 202. The hardware block is a dedicated hardware block configured to perform only operations of the monitor-enforce module 270.

The gate 275 is on the system control component 130, outside of the print head operation module. In other embodiments, the gate 275 may be provided in the print head operation module 208. The system control component 130 and/or the print head operation module 208 may have input pin(s) actuatable by the enforce module to control the gate 275.

The security information received by the monitor interface includes an authentication status for one or more supply items 150 of the imaging system, and a disable command when issued by a security device 160, 165 or the host firmware 207, and authentication information from supply item 150.

The authentication information includes a response to a challenge and the challenge is a cryptographic operation. The response is a result of the cryptographic operation returned by the supply item security device 165. The response may be a checksum and/or signature.

The monitor interface is configured to receive the security information from the I2C bus 201 which forms the security communication system of the imaging system. The monitor interface is configured to periodically check the security communication system 201 for the security information. The security communication system is a hardware signalling communication system and the monitor interface is a follower component.

The security communication system is configured to allow the monitor interface of the monitor-enforce module 270 to receive communication from: a security device 165 of a supply item of the imaging system, and/or an imaging device security device 160 and/or the host firmware 207.

The monitor interface is further configured to communicate with the host firmware 207 via channel 206. The host firmware is configured to send, to the monitor interface, information which enables the monitor-enforce module 270 to determine the authenticity of a supply item 150 based on the security information. Communication between the monitor interface and the host firmware 207 over channel 206 is separate from the security communication system 201.

The monitor interface is configured to monitor the security communication system 201. The monitor-enforce module 270 has an address on the security communication system, but is incapable of transmitting a signal on the security communication system.

In use, the system control component 130 sends a challenge on the security communication system 201 to a security device 165 of a supply item and the security device of the supply item returns a response to the challenge on the security communication system 201. The response is received by the monitor-enforce module. The security device 165 of the supply item returns a response to the challenge on the security communication system 201 to the system control component 130 and the monitor interface of the monitor-enforce module receives the response by monitoring the security communication system 201.

The enforce module is configured to interrupt signals 202 transmitted by the print head operation module 208 when the response is not authenticated. The enforce module is also configured to interrupt signals 202 transmitted by the print head operation module 208 when no security information, and/or no authenticated response has been received by the monitor interface for a pre-determined time period, and when no authenticated response has been received by the monitor interface since start-up of the imaging system. This acts to default the system to 'enforce' and make sure that the system is protected from non-authentic supply items from start-up.

The enforce module is configured to interrupt the signals 202 when the security information does not confirm the authenticity of the supply item. The enforce module is also configured to interrupt the signals when an error occurs. The enforce module is further configured to interrupt the signals when the security information contains a disable command.

The enforce module is configured to interrupt the signals 202 unless security information confirming authenticity of all supply items in the imaging system has been received during a preceding time period. The time period may be pre-set.

The signals 202 are transmitted by the print head operation module 208 on a plurality of channels (not shown in FIG. 3), each channel corresponding to a respective function of the print head, for example, a channel for each colour that the print head may use. The enforce module is configured to selectively interrupt each of the channels based on the security information. The security information includes channel security information corresponding to which of the channels should be interrupted.

Each channel is interruptible by a respective one of gates 275 and the enforce module is configured to selectively interrupt each of the channels by selectively operating the respective gates.

The security information is a security status packet (SSP). The SSP may be from the supply item security device 165 or from the imaging device security device 160.

The host firmware is configured to perform functions including supplies authentication, supplies metering, and/or enforcement of an authentication process.

A method of enforcing security on an imaging system as described above in relation to FIG. 3 will now be described. The monitor interface periodically checks the security communication system 201 of the imaging system for security information and receives the security information from a security communication system 201 of the imaging system. The enforce module then selectively interrupts signals 202 transmitted by the print head operation module 208 by operating gates 275, the selective interruption being based on the security information.

The system control component 130 sends, on the security communication system 201, to a security device 165 of a supply item 150 of the imaging system, a challenge. The monitor interface receives, on the security communication system 201 from the security device 165 of the supply item, the authentication information, the authentication information being a response to the challenge. The enforce module performs an authentication process on the response to determine if the supply item is authentic. The monitor-enforce module then selects whether to interrupt the signals 202 based on the authentication process.

The monitor interface also communicates with the host firmware 207 via communication channel 206. The host firmware 207 sends, to the monitor interface, information which enables the monitor-enforce module to determine the authenticity of a supply item based on the security information. Communication between the monitor interface and the host firmware 207 via channel 206 is separate from the security communication system 201.

Figure 4:
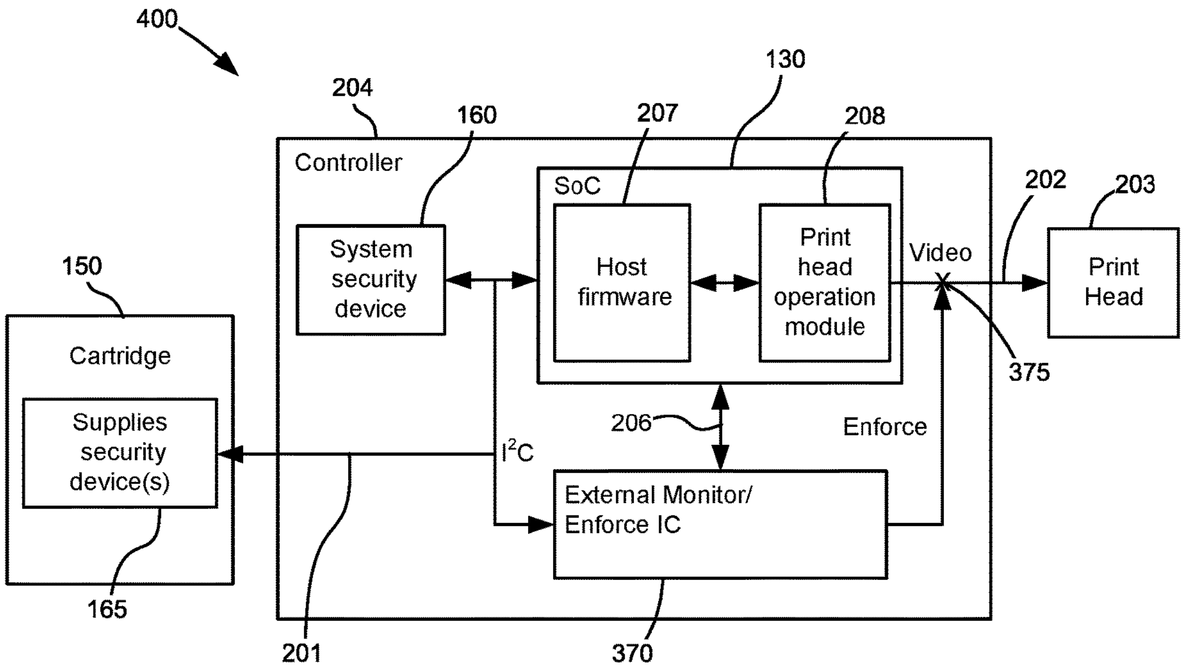
FIG. 4 is a diagrammatic view of components of an imaging system.

FIG. 4 shows some components of another imaging system 400 such as that shown in FIG. 1. The imaging system 400 is configured in the same way as imaging system 300 shown in FIG. 3, except for the differences explained below.

The imaging system 400 of FIG. 4 has a system control component 130 having host firmware 207 stored thereon. The system control component 130 comprises a print head operation module 208 actuatable by the host firmware to transmit signals 202 to a print head 203 of the imaging system. The signals are configured to cause the print head 203 to operate. The imaging system 400 further has a monitor-enforce module 370, the monitor-enforce module comprising: a monitor interface configured to receive security information from a security device 160, 165 of the imaging system, and an enforce module, the enforce module being configured to selectively interrupt said signals 202 transmitted by the print head operation module 208, based on the security information.

The monitor-enforce module 370 is separate to the system control component 130. The monitor-enforce module 370 is a programmable device which is locked or lockable. As the monitor-enforce module is separate to the system control component 130, it can be locked so as to be non-modifiable by an external device, thereby enhancing the security of the system.

In other embodiments, the monitor-enforce module 370 is an integrated circuit, for example a microcontroller or ASIC. In other embodiments, the monitor-enforce module 370 is a hardware block, for example a dedicated hardware block.

When the supply item authentication fails, the enforce module interrupts the signals 202 at gate 375. This means that even if the host firmware 207 is modified or manipulated, the enforce module will still prevent the operation of the print head by interrupting the signals.

The monitor-enforce module 370 is configured to receive security information and selectively interrupt the print head operation signals 202 via gate(s) 375. The gate 375 is outside of the system control module 130. In other embodiments, the gate 375 may be on the system control component 130. In this case, the system control component 130 and/or the print head operation module 208 may have input pin(s) actuatable by the enforce module to control the gate 375.

In the above implementations/embodiments, the various components are configured as leader/follower components. This is purely optional and other communication busses may be used.

Relatively apparent advantages of the many embodiments include, but are not limited to, providing an authentication system/method which is more difficult to satisfy/replicate due to the increased required processing power.

It will be understood that the example applications described herein are illustrative and should not be considered limiting. It will be appreciated that the actions described and shown in the example flowcharts may be carried out or performed in any suitable order. It will also be appreciated that not all of the actions described in relation to FIGS. 3 and 4 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: An imaging system comprising: a system control component comprising: a print head operation module configured to transmit signals to a print head of the imaging system, the signals configured to cause the print head to operate; and a monitor-enforce module, the monitor-enforce module comprising a dedicated hardware block on the system control component, the hardware block comprising: a monitor interface configured to receive security information from a security device of the imaging system, and an enforce module, the enforce module being configured to selectively interrupt said signals transmitted by the print head operation module, based on the security information.

Statement 2: The imaging system of statement 1, wherein the hardware block is configured to perform operations to receive security information and/or to selectively interrupt the print head operation.

Statement 3: The imaging system of statement 1, wherein the enforce module is configured to interrupt the signals transmitted by the print head operation module via a gate.

Statement 4: The imaging system of statement 1, wherein the security information comprises: authentication status for one or more supply items of the imaging system, and/or a disable command, and/or authentication information from one or more supply items of the imaging system.

Statement 5: The imaging system of statement 4, wherein the authentication information is a response to a challenge.

Statement 6: The imaging system of statement 5, wherein the response is a result of the cryptographic operation.

Statement 7: The imaging system of statement 6, wherein the response is a checksum and/or signature.

Statement 8: The imaging system of statement 1, wherein the monitor interface is configured to receive the security information from a security communication system of the imaging system.

Statement 9: The imaging system of statement 9, wherein the monitor interface is configured to periodically check the security communication system for the security information.

Statement 10: The imaging system of statement 8, wherein the security communication system is configured to allow the monitor interface of the monitor-enforce module to receive communication from: a security device of a supply item of the imaging system, and/or an imaging device security device and/or the host firmware.

Statement 11: The imaging system of statement 1, wherein the security information is a security status packet.

Statement 12: The imaging system of statement 1, wherein the print head operation module is a video output.

Statement 13: A method of enforcing security on an imaging system according to claim 1, the method comprising: selectively interrupting, by the enforce module, signals transmitted by the print head operation module, based on the security information.

Statement 14: The method of statement 13, wherein interrupting, by the enforce module, comprises operating a gate.

Statement 15: The method of statement 13, the method further comprising, receiving, by the monitor interface, the security information from a security communication system of the imaging system.

Statement 16: The method of statement 13, wherein the security information comprises: authentication status for one or more supply items of the imaging system, and/or a disable command, and/or authentication information from one or more supply items of the imaging system.

Statement 17: The method of statement 15 and 16, the method further comprising: sending, by the system control component on the security communication system to a security device of a supply item of the imaging system, a challenge, receiving, by the monitor interface on the security communication system from the security device of the supply item, the authentication information, the authentication information being a response to the challenge.

Statement 18: The method of statement 13, wherein the enforce module interrupts the signals unless security information confirming authenticity of all supply items in the imaging system has been received during a preceding time period.

Statement 19: The method of statement 13, wherein the print head operation module is a video output.

Statement 20: An electronic system comprising: a system control component comprising: a component operation module configured to transmit signals to a component of the electronic system, the signals configured to cause the component to operate; and a monitor-enforce module, the monitor-enforce module comprising a dedicated hardware block on the system control component, the hardware block comprising: a monitor interface configured to receive security information from a security device of the electronic system, and an enforce module, the enforce module being configured to selectively interrupt said signals transmitted by the component operation module, based on the security information.

What is claimed is:

1. An imaging system comprising:

a system control component having host firmware stored thereon, the system control component comprising a print head operation module actuatable by the host firmware to transmit signals to a print head of the imaging system, the signals configured to cause the print head to operate;

a I2C bus configured to allow communication between a security device of a supply item of the imaging system and the host firmware, the security device of the supply item being configured to perform a challenge received via the I2C bus and send the response via the I2C bus, thereby enabling verification of the supply item, and a monitor-enforce module, the monitor-enforce module comprising:

a monitor interface configured to receive security information from the security device of the supply item of the imaging system by monitoring the I2C bus, and an enforce module, the enforce module being configured to selectively interrupt said signals transmitted by the print head operation module, based on the security information, wherein the security information comprises authentication information from the supply items of the imaging system, wherein the authentication information is the response to the challenge, wherein the enforce module is configured to interrupt the signals transmitted by the print head operation module via a gate, and wherein the gate is located between the print head operation module and the print head.

2. The imaging system of claim 1, wherein the monitor-enforce module is on the system control component and the monitor-enforce module comprises a hardware block on the system control component, configured to receive security information and selectively interrupt the print head operation.

3. The imaging system of claim 1, wherein the monitor-enforce module is separate to the system control component.

4. The imaging system of claim 3, wherein the monitor-enforce module is a programmable device.

5. The imaging system of claim 4, wherein the programmable device is locked or lockable.

6. The imaging system of claim 1, wherein the security information comprises:

authentication status for the supply items of the imaging system, and/or a disable command.

7. The imaging system of claim 1, wherein the security communication system I2C bus is configured to allow the monitor interface of the monitor-enforce module to receive communication from:

an imaging device security device of the imaging system and/or the host firmware.

8. The imaging system of claim 1, wherein the security information is a security status packet.

9. The imaging system of claim 1, wherein the print head operation module is a video output.

10. A method of enforcing security on an imaging system according to claim 1, the method comprising:

selectively interrupting, by the enforce module, signals transmitted by the print head operation module, based on the security information, wherein interrupting, by the enforce module, comprises operating the gate.

11. The method of claim 10, the method further comprising, receiving, by the monitor interface, the security information from a I2C bus of the imaging system.

12. The method of claim 10, wherein the security information comprises:

authentication status for the supply items of the imaging system, and/or a disable command, and/or authentication information from the supply items of the imaging system.

13. The method of claims 11, the method further comprising:

sending, by the system control component on the I2C bus to a security device of a supply item of the imaging system, a challenge, receiving, by the monitor interface on the I2C bus from the security device of the supply item, the authentication information, the authentication information being a response to the challenge.

14. The method of claim 10, wherein the enforce module interrupts the signals unless security information confirming authenticity of all supply items in the imaging system has been received during a preceding time period.

15. The method of claim 10, wherein the print head operation module is a video output.

16. An electronic system comprising:

a system control component having host firmware stored thereon, the system control component comprising a component operation module actuatable by the host firmware to transmit signals to a component of the electronic system, the signals configured to cause the component to operate;

a I2C bus configured to allow communication between a security device of a component of the electronic system and the host firmware, the security device of the component being configured to perform a challenge received via the I2C bus and send the response via the I2C bus, thereby enabling verification of the component, and a monitor-enforce module, the monitor-enforce module comprising:

a monitor interface configured to receive security information from the security device of the component of the electronic system by monitoring the I2C bus, and an enforce module, the enforce module being configured to selectively interrupt said signals transmitted by the component operation module, based on the security information, wherein the security information comprises authentication information from the components of the electronic system, wherein the authentication information is the response to the challenge, wherein the enforce module is configured to interrupt the signals transmitted by the component operation module via a gate, and wherein the gate is located between the component operation module and the component of the electronic system.

* * * * *